(No Model.)
J. D. LORD & J. M. CHEEVERS.
POTATO PLANTER.
No. 347,275. Patented Aug. 10, 1886.
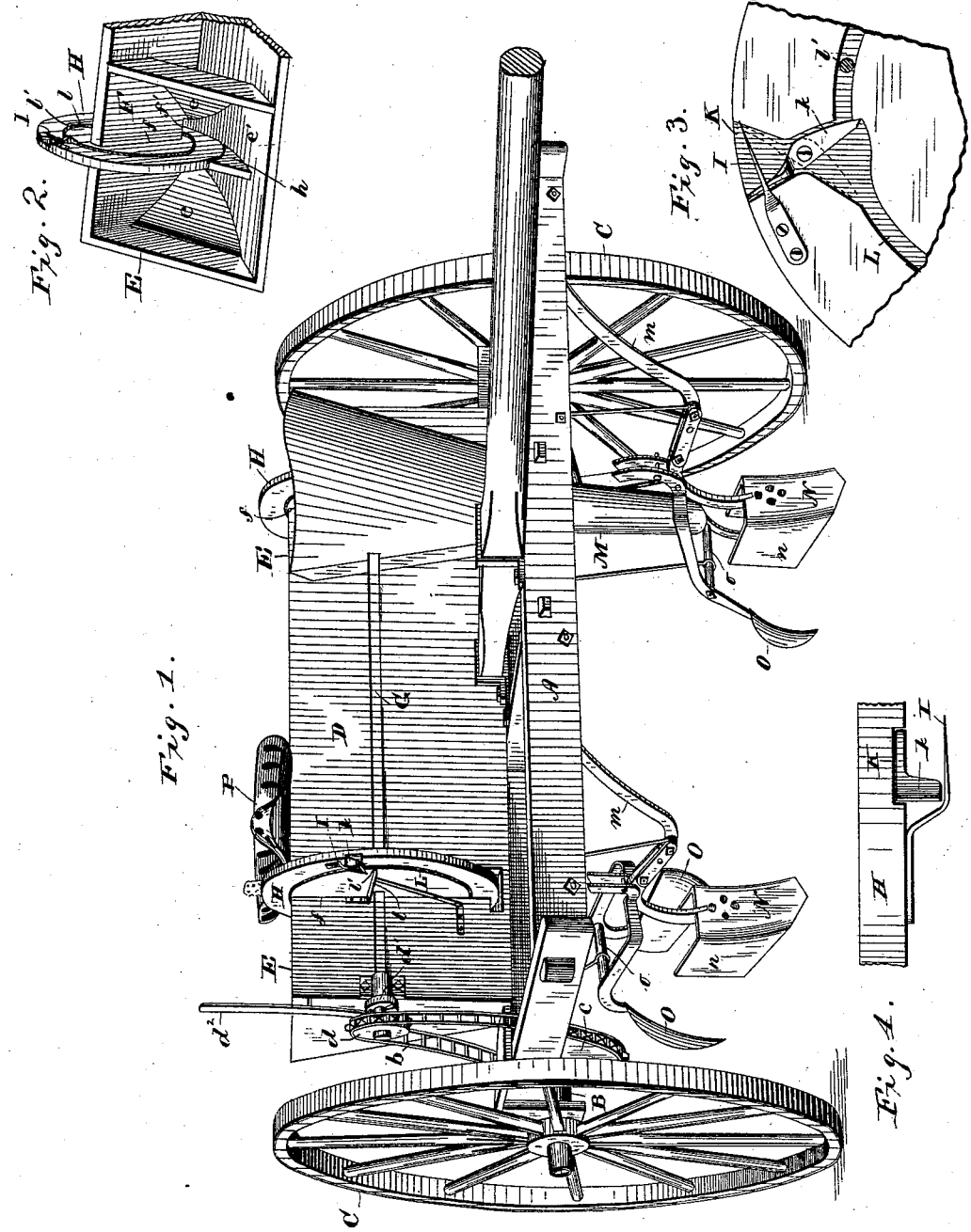
Witnesses.
Chas. R. Burr.
H. Hollerith.
Inventors.
Jerome D. Lord
John M. Cheevers
by Franck D. Johns
their Attorney

UNITED STATES PATENT OFFICE.

JEROME D. LORD AND JOHN M. CHEEVERS, OF DOVER, MICHIGAN.

POTATO-PLANTER.

SPECIFICATION forming part of Letters Patent No. 347,275, dated August 10, 1886.

Application filed April 8, 1886. Serial No. 198,224. (No model.)

*To all whom it may concern:*

Be it known that we, JEROME D. LORD and JOHN M. CHEEVERS, citizens of the United States, residing at Dover, in the county of Lenawee and State of Michigan, have invented certain new and useful Improvements in Potato-Planters; and we do hereby declare the following to be a full, clear, and exact description of the invention, such as will enable others skilled in the art to which it appertains to make and use the same.

Our invention relates to improvements in potato-planters; and it consists in certain novel construction and arrangement of the various parts, all of which we will now proceed to point out and describe, reference being had to the accompanying drawings, in which—

Figure 1 is a perspective of a potato-planter embodying our invention, one of the conveyers being removed. Fig. 2 is a perspective of one of the hoppers, and Figs. 3 and 4 are details.

Referring to said drawings, A is the main frame of the machine.

B is an axle mounted in bearings on the main frame.

C C are suitable carrying and driving wheels mounted on the axle B, one or both of said wheels being keyed to the axle.

D is a box in which are located the seed-potato hoppers E E. Said hoppers have inclined sides $e\ e$ and inclined backs $e'$, the inclined sides or backs converging toward the bottom of the hopper. The front of said hoppers are formed by perpendicular walls F, provided with perpendicular slots $f$.

G is a shaft mounted in bearings on the front of the box D.

$d$ is a sprocket-wheel mounted on the shaft G and connected by a chain, $b$, with a sprocket-wheel, $c$, rigidly mounted on the axle B. Said sprocket-wheel $d$ is provided with a suitable clutch, $d'$, and lever $d^2$, by means of which it is thrown in or out of gear with the shaft G.

H are disks rigidly mounted on the shaft G and passing through the perpendicular slots $f$.

$h$ are partitions in the hoppers E, having their forward edges curved and conforming to the periphery of the disks H. Said partitions and disks divide the hoppers E into two parts.

I are sharp spears or pickers secured to the sides of and near the peripheries of the disks. When the disks are rotated, the spears pass through small slots $f'$ in the bottom of the walls F, which slots open into the perpendicular slots $f$. As the spears or pickers enter the hoppers each spear sticks into and lifts a piece of seed-potato out of the hoppers. On the disks immediately in front of the spears are formed recesses K.

$k$ are doffers or tripping-levers pivoted in the recesses K.

L are annular grooves on the disks, said grooves passing through the recesses K.

$l$ are tripping-fingers secured to and projecting from the front walls of the hoppers on each side of the disks. Said fingers have bent ends $l'$, which enter the annular grooves L. As the disks revolve, the rear ends of the doffers strike the ends $l'$ of the fingers $l$, causing the outer ends of the doffers K to knock the potato off the spear.

M are downwardly-projecting conveyers, into which the potato drops and is conveyed to the furrow.

N are furrow openers or shovels having rearwardly-projecting wings $n$, which prevent the soil from falling in and filling up the furrow. Said shovels are provided with bent shanks, the forward ends of which are pivoted to pendent arms $m$, secured to the front of the main frame.

O are suitable followers or covering-blades having shanks pivoted to the shanks of the furrow-openers. The shanks of the followers are connected by bars $o$, to which are connected suitable ropes or rods for raising said followers and furrow-openers when not planting. In Fig. 1 we show one of the followers and shovels raised.

P is the driver's seat.

The operation of our machine is as follows: The hoppers are filled with seed-potatoes, the inclined and converging backs and sides of said hoppers causing the potatoes to rest in the bottom of the hoppers no matter how small a quantity of potatoes is in the same. The shaft G is thrown in gear, and as the disks rotate each spear passes through one of the slots $f'$ and sticks into a piece of potato, lifting it out of the hopper and depositing it in one of the conveyers, through which it is conveyed to the furrow, which is opened by the shovels N, the coverers O covering up said potato as the machine moves along. Any desired number of spears or pickers may be used. In the drawings we show two on each side of the disks, arranged diametrically opposite each other.

As shown in the drawings, our machine is arranged to plant two rows of potatoes. If desired, a single hopper may be used to plant only one row.

Having thus fully described our invention, we claim as new and desire to secure by Letters Patent—

1. In a potato-planter, the hopper E, having inclined and converging sides and back, in combination with the rotating disk H, having the spears or pickers I, the pivoted doffers K, and the tripping-fingers $l$, all arranged and operating substantially as shown and described.

2. In a potato-planter, the hopper E, provided with inclined and converging sides and back and perpendicular front wall having the slots $f$ $f'$, in combination with the rotating disk H, provided with spears or pickers I, the recesses K, the doffers $k$, pivoted in the recesses K, and the annular grooves L, and the tripping-fingers $l$, having the bent ends $l'$, all arranged and operating substantially as shown and described.

In testimony whereof we affix our signatures in presence of two witnesses.

JEROME D. LORD.
JOHN M. CHEEVERS.

Witnesses:
C. R. MILLER,
R. B. ROBBINS.